United States Patent [19]

Moïse

[11] Patent Number: 4,923,016
[45] Date of Patent: May 8, 1990

[54] SCARIFIER AND MOSS RAKE ADAPTED TO BE FITTED TO A SMALL POWER DRIVEN CULTIVATOR

[75] Inventor: René F. Moïse, Vichy, France

[73] Assignee: Forges des Margerides S.A., S-Yorre, France

[21] Appl. No.: 327,806

[22] PCT Filed: May 24, 1988

[86] PCT No.: PCT/FR88/00265
§ 371 Date: Jan. 23, 1989
§ 102(e) Date: Jan. 23, 1989

[87] PCT Pub. No.: WO88/09113
PCT Pub. Date: Dec. 1, 1988

[30] Foreign Application Priority Data

May 25, 1987 [FR] France .................. 87 07647

[51] Int. Cl.⁵ .............. A01B 45/02; A01B 33/02
[52] U.S. Cl. .................. 172/21; 172/42; 172/429; 172/243; 172/76; 56/17.2
[58] Field of Search .............. 56/17.1, 17.2; 172/42, 172/43, 76, 78, 240, 243, 429; 280/43.17

[56] References Cited

U.S. PATENT DOCUMENTS

| 2,601,653 | 6/1952 | Wolfe | 172/429 X |
| 2,794,308 | 6/1957 | Cavanaugh | 56/26 |
| 2,977,740 | 4/1961 | King | 56/17.2 |
| 3,127,940 | 4/1964 | Hutchinson | 172/79 |
| 4,028,868 | 6/1977 | Zehrung | 56/17.2 |
| 4,336,760 | 6/1982 | Cohen | 172/43 |
| 4,483,400 | 11/1984 | Arndt | 172/42 |
| 4,503,630 | 3/1985 | Riley | 37/94 |
| 4,802,536 | 2/1989 | O'Neal | 172/42 |

FOREIGN PATENT DOCUMENTS

| 89548 | 8/1960 | Denmark | 172/76 |
| 690298 | 9/1930 | France . | |
| 1376521 | 10/1964 | France . | |

Primary Examiner—Richard J. Johnson
Attorney, Agent, or Firm—Marilyn Brogan

[57] ABSTRACT

A power operated hand guided device is designed to scarify, edge, and aerate lawns and grass. It comprises tools in the form of blades (26) which rotate in a vertical plane about the common axis of a pair of tool-holder shafts. Each tool holder shaft (21) is rotatably connected to a bearing (12) supported on a vertically adjustable beam (23) having wheels (24 and 25) or rollers at each end. A brake (37) which retards the forward movement by friction with the ground is connected to the motor assembly by a rod (38).

5 Claims, 4 Drawing Sheets

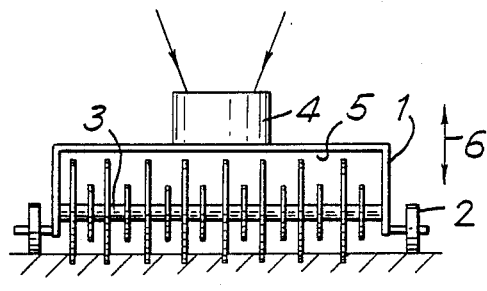
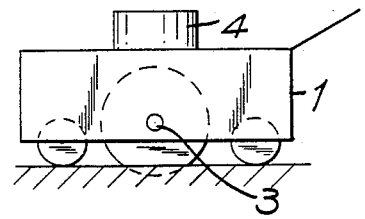
FIG. 1
PRIOR ART
FIG. 1a
PRIOR ART
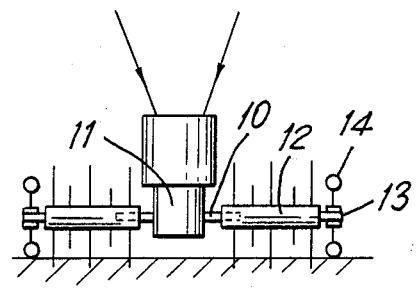
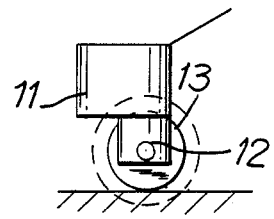
FIG. 2
PRIOR ART
FIG. 2a
PRIOR ART
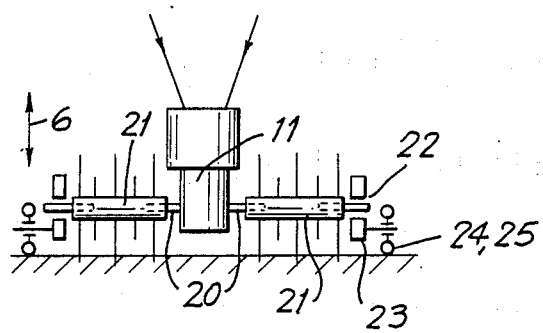
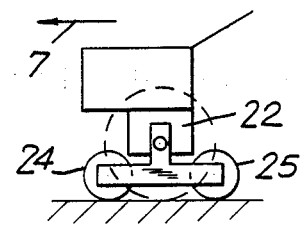
FIG. 3
FIG. 3

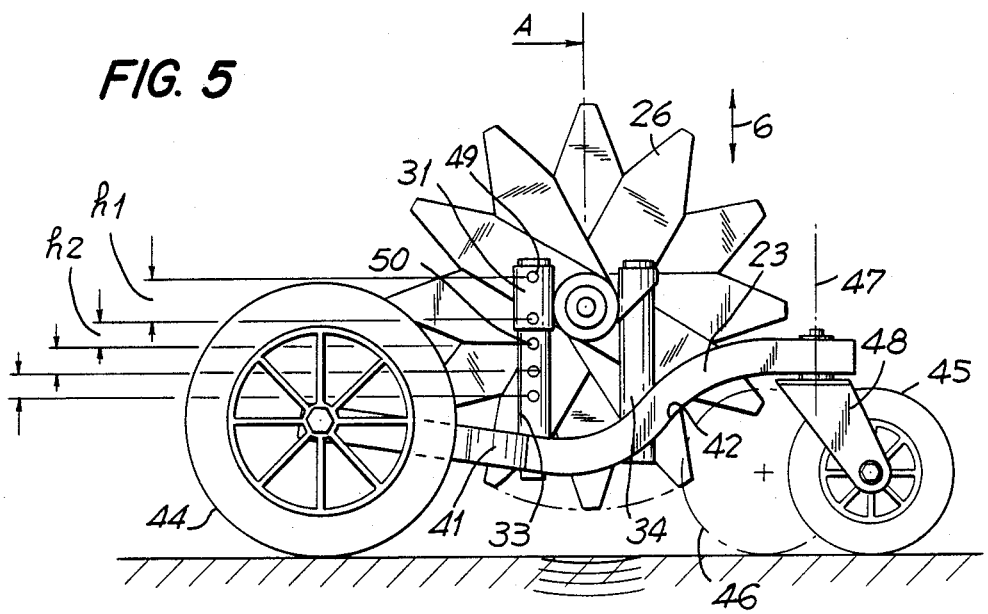
FIG. 5
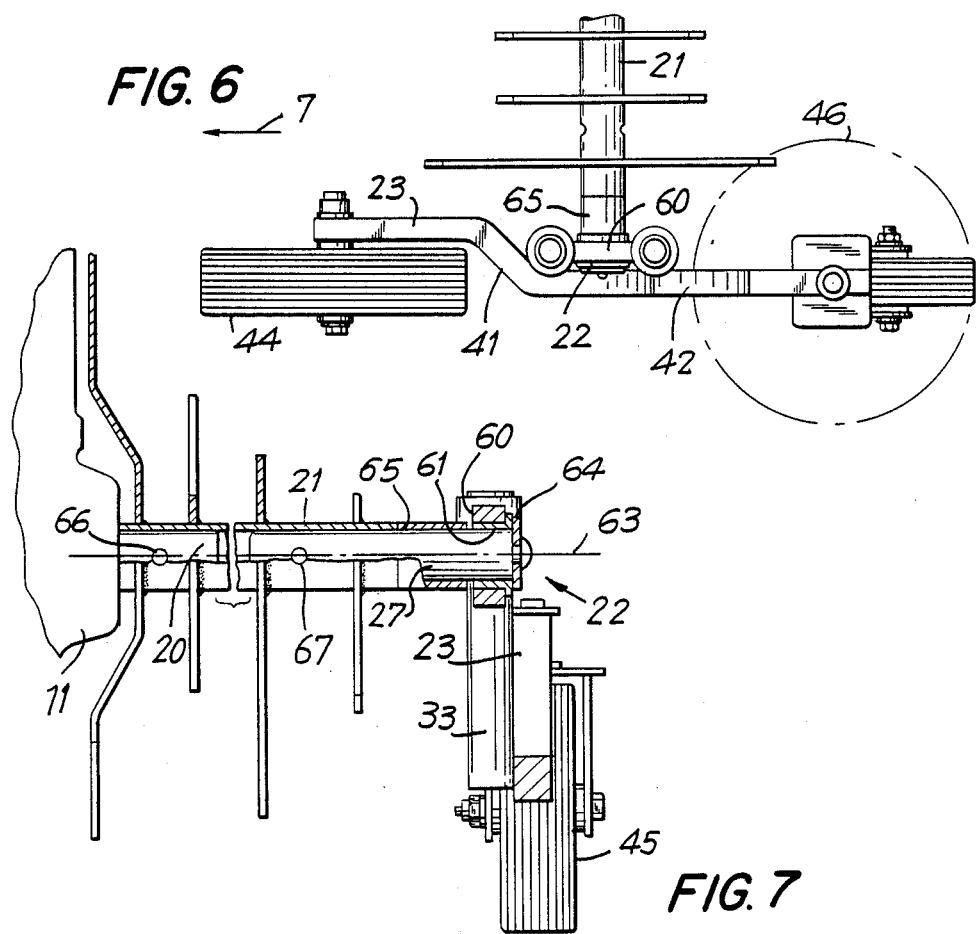
FIG. 6
FIG. 7

SCARIFIER AND MOSS RAKE ADAPTED TO BE FITTED TO A SMALL POWER DRIVEN CULTIVATOR

BACKGROUND OF THE INVENTION

The present invention is concerned with the field of mechanized garden cultivation and its object is a scarifier, moss rake and lawn or grass aerator device.

Various small devices are known which are intended mainly for lawn maintenance and which carry tools in the form of blades rotating in a vertical plane and disposed along a motor driven shaft. A first type of device comprises a frame in the form of a box open at its bottom face and supporting a motor on its top face, which forms a cover; one or more shafts supporting the blades is or are disposed inside the box; this shaft is in turn supported by bearings on the box and is driven by the motor with the aid of a chain drive, for example; the box is provided with side wheels or rollers. In a device of this kind the depth of cut is adjustable by regulating either the height of the shaft relative to the wheels or the height of the wheels relative to the box. Devices of this kind are practical, but they have the disadvantage of being dedicated to one particular type of work.

Small devices of the motorized rake type are also known, in which the drive half-shafts project at the side of a motor casing and are adapted to receive either wheels, when the device is to be used as traction means, or rotary tools. To enable the device to be used as a scarifier, equipments have thus been proposed which consist of a pair of shafts adapted to be connected by sleeve couplings to the drive half-shafts at one end, while their other end is provided with a wheel hub and a wheel adapted to turn freely about the hub; each shaft carries a plurality of scarifier blades; the coupled end is fastened to the drive half-shaft by means of a pin; the rotation of the motor rotates the blades, while the rotation of the wheels, that is to say the propulsion of the device, is dependent solely on the operator. The advantage of a device of this kind is its ability to be used for various types of work, but a disadvantage is that the depth of cut into the ground is dependent on the diameter of the wheels, and is therefore not adjustable for a given equipment.

For more precise information regarding the prior art reference may be made to the following publications: U.S.-A-No. 4,483,400 (ARNDT), U.S.-A-No. 3,127,940 (HUTCHINSON), U.S.-A-No. 2,794,308 (CAVANAUG), FR-A-1,376,521 (BRIBAN) and FR-A-690,298 (KOROUM).

SUMMARY

The present invention relates to a device for equipping small mechanized cultivation motors, which is of the second type described above and which is detachable in order to permit the multipurpose use of the motor and enables the depth of cut to be adjusted.

According to the present invention, a cultivation device of the so-called "scarifier" type cuts into the ground with the aid of tools in the form of blades rotating in a vertical plane about the common axis of a pair of tool carrier shafts. Each of these shafts is supported at a first end by a drive half-shaft of a small drive unit of the "motorized hoe" type and is connected to free rotation to a bearing supported by a longitudinal member equipped with wheels or rollers at each end.

The device preferably incorporates means for the adjustment of the height of said bearing above the longitudinal member, in such a member as to regulate the depth of cut into the ground. Despite this adjustability of the depth of cut, the longitudinal members are connected together only by means of the tool carrier shafts.

In a preferred form of construction of the device according to the invention the connection between the bearing and the longitudinal member is made by a pair of slides fastened to the bearing and provided with cavities whose axes are substantially vertical, and by a pair of pillars fastened to the longitudinal members and shaped to slide in said slides. In this embodiment at least one of the slides and the corresponding pillar are provided with means for securing them in their relative positions. The securing means enables the adjustment of the height of the bearing above the longitudinal members.

In a particularly simple form of construction of the securing means, a pair of holes are formed along the slide for the passage of a pin, and a plurality of similar holes are formed in the pillar. The distance h1 separating the holes in the slide is equal to three times half the distance h2 separating the holes in the pillar ($h1 = 3 \cdot h2/2$).

According to an advantageous constructional feature the relationship of free rotation between each tool carrier shaft and the corresponding bearing is achieved by means of a second half-shaft engaged in the bearing. The relationship between said second half-shaft and the bearing is fixed in the axial direction with the aid of an end washer and a sleeve supported on the half-shaft. The second half shaft is rotatable in the bearing with the aid of an antifriction ring disposed between the half-shaft and the bearing.

According to another constructional arrangement the longitudinal member has a first steplike offset in the horizontal plane adjacent its front half, as the result of which the front wheel can be disposed at the side of the longitudinal member, and a second steplike offset in the vertical plane adjacent its rear half as the result of which the rear wheel can be disposed under the longitudinal member. The connection between the rear wheel and the longitudinal member is advantageously made by a fork mounted on the longitudinal member to pivot about a vertical axis.

BRIEF DESCRIPTION OF THE DRAWINGS

The present invention will be better understood and details relating thereto will engage from the description given below with reference to the accompanying drawings, in which:

FIGS. 1 and 1a illustrate schematically a first type of device of the prior art, FIGS. 2 and 2a similarly illustrate a device of the second type of the prior art, while FIGS. 3 and 3a illustrate in comparable manner the principle of the device according to the invention, FIG. 5 is a partial elevation of the device on a larger scale, FIG. 6 is a top plan view of the device illustrated in FIG. 5, FIG. 7 is a partial sectional view taken along the line A in FIG. 5.

DESCRIPTION OF CERTAIN PREFERRED EMBODIMENTS

Figure 4:
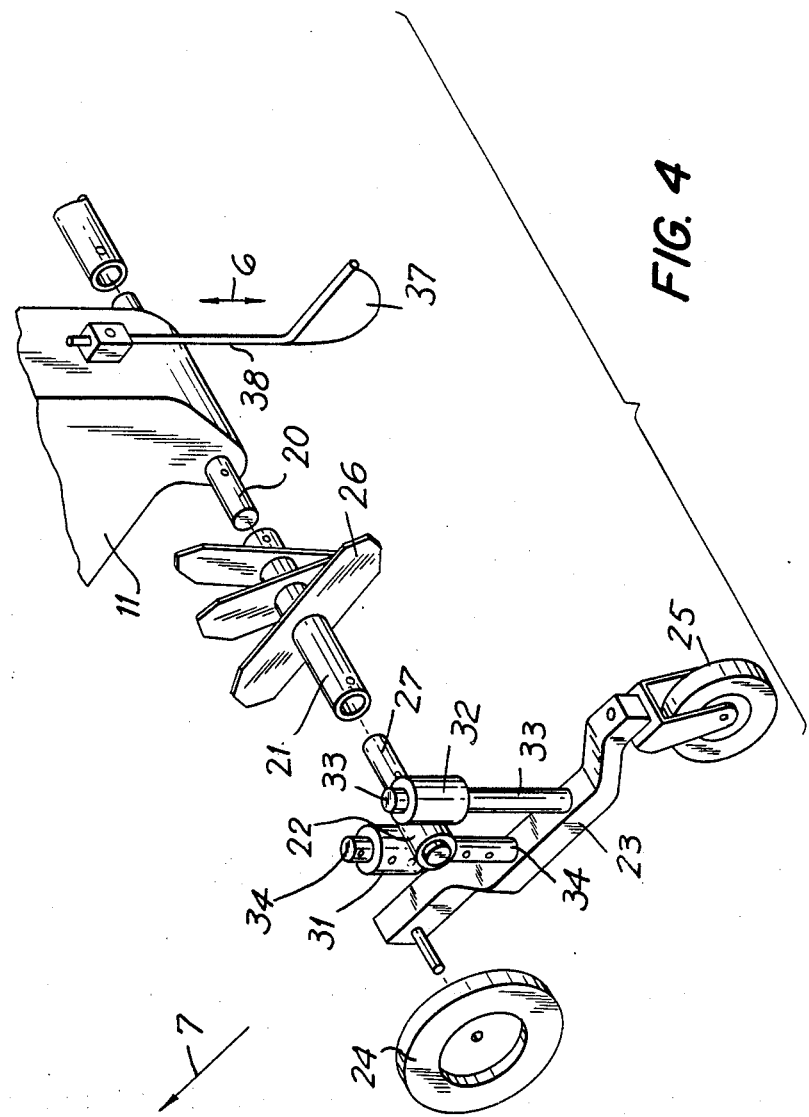
FIG. 4 is a partial exploded view in perspective of one form of construction of said device.
Figure 8:
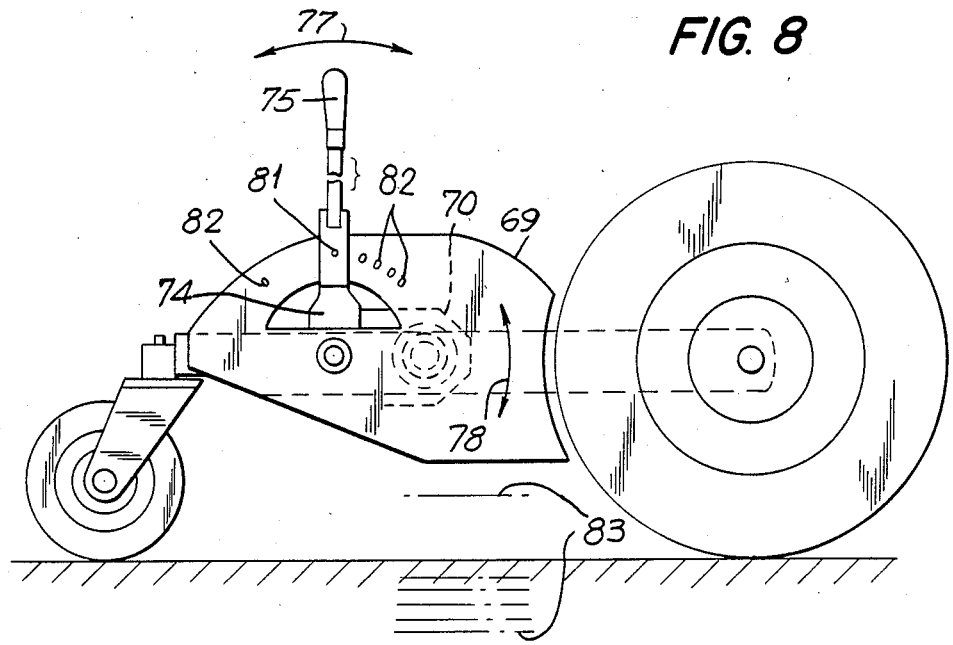
FIG. 8 is a side elevational view of a device in accordance with another illustrative embodiment of the invention.
Figure 9:
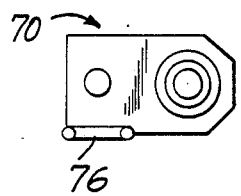
FIG. 9 is a side elevational view of a horizontal arm utilized in the embodiment of FIG. 8.
Figure 10:
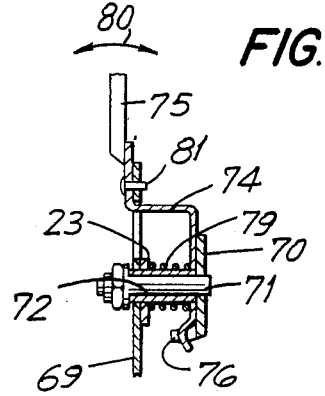
FIG. 10 is a vertical sectional view of the horizontal arm illustrated in FIG. 9, together with certain associated parts.
Figure 11:
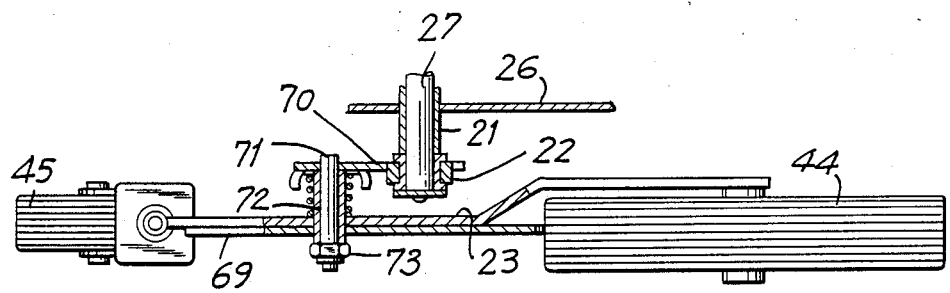
FIG. 11 is a top plan view of the device of FIG. 8, with certain components shown in section.

In FIGS. 1 and 1a a specialized type of scarifier of the prior art comprises a box frame 1 equipped with side wheels 2 and containing in its interior a scarifier blade carrier shaft driven by a motor unit 4; transmission means 5 transmit the rotary motion from the motor to the shaft; a device of this kind is provided with means for adjusting the height of the shaft 3 above the ground; it will be observed that the wheels 2 are independent of the shaft 3.

In all the drawings the arrows 6 indicate adjustability of height and the arrows 7 the direction of advance.

In FIGS. 2 and 2a, in another device of the prior art, half-shafts such as 10 project from a motor casing 11 and are fastened to blade carrier half-shafts, such as 12. The outer end of each half-shaft 12 is shaped as a hub 13, on which is mounted a wheel 14 which is free to turn about the hub. In contrast to the preceding case, the wheels are connected to the blade carrier shafts even if they are free to rotate relative to these shafts. In this case the depth of the cuts made in the ground by the blades is determined by the difference between the diameter of the wheels and that of the blades. It will be noted that the device shown in FIG. 2 is not restricted to scarification since the shafts 12 can be replaced with driven wheels for example, with hoe blades, or with other rotating implements.

It will be recalled that the invention proposes an equipment adapted to be fitted to a drive unit, as is the equipment shown in FIGS. 2 and 2a, but one which in addition has the advantage of adjustability in height, as in the case of the device shown in FIG. 1.

In FIGS. 3, 3a and 4 a scarifier equipment comprises a pair of tool carrier shafts 21 which are each connected at a first end by a sleeve coupling adjacent drive half-shaft 20 and at their second end to a bearing 22 supported by a longitudinal member 23 provided at its front and rear ends with respective wheels 24, 25. It will be observed that an equipment of this type is adapted to be fitted to the same drive unit 11 as the equipment shown in FIGS. 2 and 2a. However, the depth of cut no longer depends on the difference between the diameters of the wheels, on the one hand, and the blades on the other hand, but it is determined by the height of the bearing above the longitudinal member.

In FIG. 4 it can more particularly be seen that the connection between the bearing 22 and the longitudinal member 23 is made with the aid of a pair of slides 31, 32 fastened to the bearing; these slides have cavities whose axes are vertical and through which pass respective pillars 34 and 33 fastened at their bases to the longitudinal member 23.

The shaft 21 carrying a plurality of blades 26 is hollow in order to be able to receive, at a first end, the drive half-shaft 20 and, at its second end, a second half-shaft 27 extending into the bearing 22. Correspondingly disposed holes for pins enable the shaft 21 to be made fast to the half-shafts 20 and 27. It should be understood that FIG. 4 shows only half of an equipment. In addition it will be seen that this figure that to the rear of the drive unit 11 a brake spur 37 is provided which is intended to slow down forward movement by rubbing against the ground, this spur of substantially semicircular shape being connected to the drive unit by a rod 38 of adjustable length.

In FIGS. 5 and 7, which show only half of an equipment and which omit the drive unit, the shape of the longitudinal member 23 will be more particularly observed. The member 23 has two steplike offsets, which term is intended to mean a shape in which the member is bent over in a plane, once in one direction and once in the opposite direction, so that the rectilinear parts of the member are no longer in alignment, while still being parallel. A first such offset 41 in the horizontal plane enables the front wheel 44 to be accommodated in such a manner that the center plane of said wheel coincides with the center plane of the other part of the longitudinal member (FIG. 6), while a second such offset 42 in the vertical plane enables the rear wheel 45 to be disposed under the longitudinal member and to be freely pivotable as shown by the dot-dash line 46 about a vertical axis 47. The rear wheel 45 is held in a fork 48 mounted for pivoting about the axis 47. In figure the means for adjustment of the height of the blades 26 relative to the ground will be particularly observed: the slide 31 is provided with two holes 49 lying a distance h1 apart, while the pillar 33 has a plurality of similar holes, such as 50, lying a distance h2 apart, h1 being equal to 3·h2/2.

As shown in FIG. 7 the half-shaft 27 is located at its outer end in the bearing 60, which for example is annular, and include an annular antifriction ring 61 of antifriction metal. Instead of the antifriction ring a rolling contact bearing may be employed, although this may not be justified for the small forces or low speeds involved. The half-shaft 27 is secured from movement along the axis 63 by an end washer 64 on one side of the bearing 60, and by a sleeve 65 bearing against the blade carrier shaft 21 on the other side. The tubular structure of the shaft 21 enables it to be sleeved around the half-shafts 20 and 27, to which it is fastened in respect of both rotation and translation by pins which are not shown in the drawings but which pass through holes 66 and 67 respectively.

While the adjustment of the height above the ground in the device shown in FIGS. 4 to 7 is achieved by sliding translatory movement of the bearing 22 relative to the longitudinal member 23, a method of height adjustment by rotation will now be described.

In FIGS. 8 to 11 a device according to a second embodiment of the invention comprises, like the device described above, a pair of wheels 94 and 95 mounted on a longitudinal member 93, which in this case is rectilinear and fastened to a side plate 69. The device also comprises two hollow shafts 91 equipped with scarifier blades 96 and intended to receive half-shafts 97; as previously, the shafts 91 are mounted for rotation in bearings 92. However, in contrast to the device described above, the bearings 92 are here not fastened to vertical slides, but each of them is fastened to a horizontal arm 70 supporting a horizontal half-shaft 71. The longitudinal member 93 in turn supports a horizontal sleeve 72 intended to receive the half-shaft 71. The half-shaft 71 and the sleeve 72 are fastened one in the other by a nut 73 preventing their translatory movement relative to each other but allowing their rotation.

A bent lever 74 provided with an operating handle 75 is pivotally mounted on the half-shaft 71 and is fixed for rotation with the arm 70 by means of a fork 76. As a result, the pivoting of the handle as shown by arrow 77 entails an identical pivoting (arrow 78) of the arm 70 and consequently a variation of the height, relative to the ground, of the hollow shaft 91, the scarifier blades and the drive unit (not shown in these figures).

The bent lever 74 is pressed against the arm 70 by a spring 79. Because of the fork 76 and of sufficient clearance around the sleeve 72, the lever 74 can pivot transversely (arrow 80); as the result of this pivoting and with the aid of a pin 81 adapted to snap into one of the apertures 82 in the plate 69, the scarifier blades can be fixed at certain heights 83 above the ground. This second embodiment has the advantage of being simpler to assemble than the previous one.

Although particular embodiments of the invention have been described and illustrated, it must be understood that the scope of the invention is not limited to these embodiments, but that it extends to any agricultural device having the general characteristics indicated above; in particular it extends to devices other than scarifiers which have rotating blades serving a different purpose from that described and requiring height adjustment for their optimum utilization.

I claim:

1. A cultivation device having ground cutting tools arranged for rotation in vertical planes about a common axis, the device comprising, in combination:
   a drive unit including a pair of drive half-shafts coaxially extending from opposite sides thereof;
   a pair of tool carrier shafts extending outwardly from the respective drive half-shafts;
   two bearing members mounted adjacent the respective outer ends of the tool carrier shafts, the tool carrier shafts being freely rotatable with respect to their corresponding bearing members;
   a plurality of longitudinal members extending in directions traverse to said common axis for respectively supporting said bearing members, said longitudinal members are connected together only by means of said bearing members, said tool carrier shafts and said drive half-shafts;
   wheel means rotatably carried adjacent each end of each of said longitudinal members; and
   means for adjustably connecting each of said bearing members to its supporting longitudinal member, to thereby permit adjustment of the depth of cut into the ground of said cutting tools.

2. A cultivation device having ground cutting tools arranged for rotation in vertical planes about a common axis, the device comprising, in combination:
   a drive unit including a pair of drive half-shafts coaxially extending from opposite sides thereof;
   a pair of tool carrier shafts extending outwardly from the respective drive half-shafts;
   two bearing members mounted adjacent the respective outer ends of the tool carrier shafts, the tool carrier shafts being freely rotatable with respect to their corresponding bearing members;
   a plurality of longitudinal members extending in directions transverse to said common axis for respectively supporting said bearing members;
   wheel means rotatably carried adjacent each end of each of said longitudinal members; and
   means for adjustable connecting each of said bearing members to its supporting longitudinal member, in which the adjustable connecting means for each bearing member comprises a pair of slide members fastened to the bearing member and having vertically extending openings therein, a pair of pillars slidably disposed in the openings in the respective slide members and means for releasably securing the slide members to their corresponding pillars, to thereby permit adjustment of the depth of cut into the ground of said cutting tools.

3. A cultivation device as defined by claim 2, said slide members and said pillars each including a plurality of spaced holes, the spacing between the holes in the slide members being three times one-half the spacing between the holes in the pillars.

4. A cultivation device having ground cutting tools arranged for rotation in vertical planes about a common axis, the device comprising, in combination:
   a drive unit including a pair of drive half-shafts coaxially extending from opposite sides thereof;
   a pair of tool carrier shafts extending outwardly from the respective drive half-shafts;
   two bearing members mounted adjacent the respective outer ends of the tool carrier shafts, the tool carrier shafts being freely rotatable with respect to their corresponding bearing members;
   a plurality of longitudinal members extending in directions transverse to said common axis for respectively supporting said bearing members;
   wheel means rotatably carried adjacent each end of each of said longitudinal members; and
   means for adjustable connecting each of said bearing members to its supporting longitudinal member, to thereby permit adjustment of the depth of cut into the ground of said cutting tools, wherein the means for adjustable connecting each bearing member to its supporting longitudinal member comprises an arm fastened adjacent one to its ends to the bearing member, a sleeve fastened to the longitudinal member, and an interconnecting shaft disposed within said sleeve and fastened adjacent the other end of the bearing member.

5. A cultivation device as defined by claim 4, which further comprises a side plate mounted on one of said longitudinal members and having a plurality of apertures therein; a lever connected to said arm and extending therefrom in juxtaposition with said side plate; and pin means carried by said lever in position to be received by said apertures, whereby movement of said lever pivots said arm to adjust the depth of cut into the ground of said cutting tools.

* * * * *